(12) United States Patent
Schlager

(10) Patent No.: US 12,097,753 B2
(45) Date of Patent: Sep. 24, 2024

(54) ELECTRIC VEHICLE AIR CONDITIONING SYSTEM AND METHOD

(71) Applicant: MAGNA INTERNATIONAL INC., Aurora (CA)

(72) Inventor: Gerd Schlager, Kefermarkt (AT)

(73) Assignee: MAGNA PT B.V. & CO. KG, Untergruppenbach (DE)

( * ) Notice: Subject to any disclaimer, the term of this patent is extended or adjusted under 35 U.S.C. 154(b) by 467 days.

(21) Appl. No.: 17/275,277

(22) PCT Filed: Sep. 11, 2019

(86) PCT No.: PCT/CA2019/051279
§ 371 (c)(1),
(2) Date: Mar. 11, 2021

(87) PCT Pub. No.: WO2020/051696
PCT Pub. Date: Mar. 19, 2020

(65) Prior Publication Data
US 2022/0118824 A1  Apr. 21, 2022

Related U.S. Application Data

(60) Provisional application No. 62/729,582, filed on Sep. 11, 2018.

(51) Int. Cl.
*B60H 1/32* (2006.01)
*B60H 1/00* (2006.01)

(52) U.S. Cl.
CPC ....... *B60H 1/3208* (2013.01); *B60H 1/00392* (2013.01); *B60H 1/3222* (2013.01)

(58) Field of Classification Search
CPC . B60H 1/3208; B60H 1/00392; B60H 1/3222
See application file for complete search history.

(56) References Cited

U.S. PATENT DOCUMENTS 3,481,436 A * 12/1969 Wilkowski ......... B60K 17/3505
192/38
6,251,042 B1 * 6/2001 Peterson ............. B60H 1/3222
477/3

(Continued)

FOREIGN PATENT DOCUMENTS

DE  102014004741 A1  10/2015
JP  2011213163 A  10/2011

(Continued)

*Primary Examiner* — Gordon A Jones
(74) *Attorney, Agent, or Firm* — Dickinson Wright PLLC

(57) ABSTRACT

A vehicle system includes an electric motor that also operates as a generator. A torque transfer mechanism is attached to the electric motor and a second torque transfer mechanism is connected via a disconnect mechanism. An AC compressor is attached to the first torque transfer mechanism via a clutch, which has an open position and a closed position. During recuperation, the second torque transfer mechanism is connected to the first torque transfer mechanism and the clutch is closed, and the compressor is driven by the motor. During stand-still, the second torque transfer mechanism is disconnected from the first torque transfer mechanism, and the compressor is driven by the motor. During drive operation, the second torque transfer mechanism is connected to the first torque transfer mechanism, and the clutch is open such that the compressor is not driven, but the system continues to provide cool air to the vehicle cabin.

9 Claims, 1 Drawing Sheet

(56) References Cited

U.S. PATENT DOCUMENTS

| | | | |
|---|---|---|---|
| 6,634,247 B2 | 10/2003 | Pels et al. | |
| 6,701,731 B2* | 3/2004 | Aikawa | F25B 41/00 |
| | | | 62/437 |
| 8,494,712 B2* | 7/2013 | Vasilescu | B60K 6/48 |
| | | | 180/65.27 |
| 8,808,124 B2* | 8/2014 | Major | B60K 25/00 |
| | | | 180/65.265 |
| 9,765,869 B2* | 9/2017 | Holmes | F16H 37/021 |
| 9,849,771 B2* | 12/2017 | Zhang | F16H 3/085 |
| 10,131,221 B2* | 11/2018 | Choi | B60K 6/36 |
| 10,807,441 B2* | 10/2020 | Norden | B60L 50/16 |
| 2010/0145573 A1* | 6/2010 | Vasilescu | B60W 10/02 |
| | | | 192/48.1 |
| 2011/0251019 A1* | 10/2011 | Ulrey | B60H 1/00314 |
| | | | 477/98 |
| 2012/0221197 A1* | 8/2012 | Hisada | B60L 1/003 |
| | | | 74/665 F |
| 2013/0006460 A1 | 1/2013 | Endo et al. | |
| 2017/0197492 A1* | 7/2017 | Ishizeki | F25B 49/022 |
| 2017/0203637 A1* | 7/2017 | Berkson | B60H 1/004 |
| 2018/0162377 A1* | 6/2018 | Colavincenzo | B60K 6/26 |
| 2021/0246972 A1* | 8/2021 | Schlager | F16H 7/06 |
| 2022/0243646 A1* | 8/2022 | Hoefer | F02B 67/06 |

FOREIGN PATENT DOCUMENTS

| | | | | | |
|---|---|---|---|---|---|
| JP | 2011213164 | A | 10/2011 | | |
| JP | 6156399 | B2 | 7/2017 | | |
| WO | WO-2015065643 | A1 * | 5/2015 | | B60H 1/00014 |
| WO | 2017102343 | A1 | 6/2017 | | |

* cited by examiner

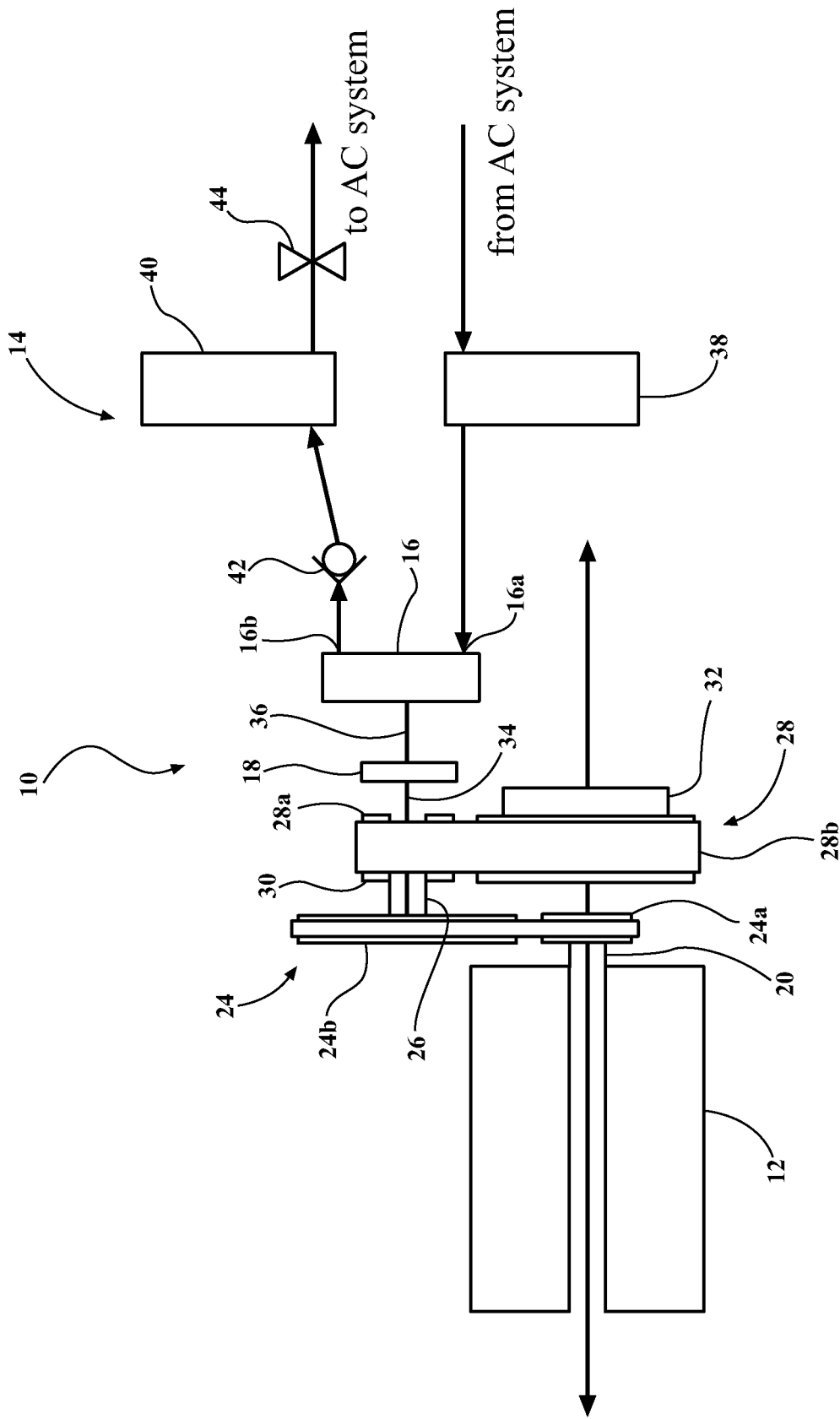

ELECTRIC VEHICLE AIR CONDITIONING SYSTEM AND METHOD

CROSS-REFERENCE TO RELATED APPLICATION

This U.S. National Stage Patent Application claims the benefit of PCT International Patent Application Serial No. PCT/CA2019/051281 filed Sep. 11, 2019 entitled "Connector Arrangement With Environmental And Electrical Protection" which claims the benefit of and priority to U.S. Provisional Patent Application Serial No. 62/729,665 filed on Sep. 11, 2018, titled "Connector Arrangement With Environmental Protection," the entire disclosures of which are hereby incorporated by reference.

TECHNICAL FIELD

The present disclosure relates to electric vehicle systems. More particularly, the present disclosure relates to an air conditioning system for an electric vehicle.

BACKGROUND OF THE DISCLOSURE

Electric passenger vehicles, such as purely electric or hybrid electric vehicles are in common use in the passenger vehicle industry as well as the commercial vehicle industry. Electric vehicles rely on energy from a battery to power various vehicle systems and controls. The addition of further systems and controls to an electric vehicle increases the need for additional energy or battery storage. However, larger batteries are both more expensive and take up a larger amount of space in the vehicle, where space can be limited.

The range of electric vehicles, and in particular pure electric vehicles or Battery-operated electric vehicles (BEV), depends on the amount of energy used by the battery relative to the amount of energy stored by the battery. Batteries can be re-charged at charging stations, similar to refueling a traditional vehicle. Battery charging stations, however, can be more difficult to locate.

Another way to re-charge the battery or limit the rate of depletion of the battery is through the use of recuperation. One common type of recuperation is regenerative braking, which utilizes a brake-by-wire approach to slow the rotational speed of the wheels by converting the kinetic energy of the wheels into electric potential energy, where the electric motor functions as a generator. A braking request from the vehicle driver, or a driver-assist or self-driving system request, will actuate the regenerative braking. Traditional friction braking using brake pads along with a disc or drum is preferably used in addition to the regenerative braking to increase the rate of deceleration or to completely stop. A friction-based parking lock may be used during vehicle standstill.

Regenerative braking can be useful to extend the life of the battery charge, but it can also lead to overcharging, which can deplete the maximum charge in the battery and decrease the battery life-span.

One vehicle system that can demand a large amount of power from the battery is the vehicle air conditioning system. The air conditioning system may include a compressor that converts liquid refrigerant into gas. Traditional compressors in gas-powered vehicles are driven by the internal combustion engine. The compressor in an electric vehicle is powered by the battery. Thus, the use of the air conditioning system in an electric vehicle can lead to an increased rate of depletion of the battery, requiring more frequent charging and reduced range.

In view of the foregoing, there remains a need for improvements to HVAC systems in electric vehicles.

SUMMARY OF THE INVENTION

A system for operating an air conditioning system of a vehicle is provided. The system includes an electric motor having regenerative capabilities connected to a battery, a disconnect mechanism disposed between the electric motor and at least one of the wheels, the disconnect mechanism having an open state and a closed state, and an AC compressor connected to the electric motor via a clutch.

The system includes a recuperation state, in which the disconnect mechanism is closed and the clutch is closed, and recuperation energy from the wheels and energy from the motor drive the compressor.

The system includes a stand-still state, in which the disconnect mechanism is open and the clutch is closed, and the motor drives the compressor. The system further includes a drive operation state, in which the disconnect mechanism is closed and the clutch is open, and the compressor is de-coupled from the motor.

The system provides cooling to the vehicle cabin during the drive operation state when the compressor is not being driven by the motor.

In one aspect, the system includes a first torque mechanism coupled to the motor via a first shaft, wherein rotation of the motor causes rotation of the first torque mechanism.

In one aspect, the system includes a second torque mechanism coupled to a shaft for driving the wheels, wherein rotation of the second torque mechanism causes rotation of the shaft, wherein the second torque mechanism is selectively coupled to the first torque mechanism via the disconnect mechanism.

In one aspect, the first torque mechanism includes a small diameter element coupled to a large diameter element, and the second torque mechanism includes a small diameter element coupled to a large diameter element, wherein the large diameter element of the first torque mechanism is selectively coupled to the small diameter element of the second torque mechanism via the disconnect mechanism.

In one aspect, a park lock mechanism is selectively coupled to the second torque mechanism to prevent rotation of the second torque mechanism and prevent driving of the wheels.

In one aspect, the system includes a first clutch shaft selectively coupled to a second clutch shaft via the clutch, wherein the first clutch shaft is coupled to the first torque mechanism and the second clutch shaft is coupled to the compressor.

In one aspect, in the drive operation state, the clutch is open and the park lock mechanism is open, such that rotation of the motor drives the wheels via the rotation of the first torque mechanism and the second torque mechanism.

In one aspect, in the stand-still state, the clutch is closed and the park lock mechanism is closed, such that rotation of the motor drives the compressor via the first torque mechanism and the first and second clutch shafts, while the second torque mechanism does not rotate.

In one aspect, in the recuperation state, the park lock mechanism is open and the clutch is closed, wherein recuperation energy from the wheels powers the compressor.

In one aspect, the motor operates as a generator in the recuperation state.

In one aspect, the system includes an accumulator coupled to the compressor as part of an AC system, wherein the accumulator powers the AC system in the drive operation state when the compressor is not driven.

In another aspect of the disclosure, a method for operating an air conditioning system to provide cool air to a vehicle cabin in a vehicle is provided. The method includes the steps of, in response to detecting a recuperation state, closing a disconnect mechanism disposed between an electric motor and at least one of the wheels, the motor having regenerative capabilities connected to a battery, closing a clutch connected between an AC compressor and the electric motor, and driving the compressor via the motor and recuperation energy from the wheels.

The method further includes, in response to detecting a stand-still state, opening the disconnect mechanism and closing the clutch, and driving the compressor via the motor. In response to detecting a drive operation state, the method includes closing the disconnect mechanism and opening the clutch, and operating the air conditioning system and providing cool air to the vehicle cabin with the compressor de-coupled from the electric motor and when the compressor is not being driven.

In one aspect, the motor is coupled to a first torque mechanism, which is selectively coupled to a second torque mechanism via the disconnect mechanism, wherein the second torque mechanism drives the wheels of the vehicle.

In one aspect, a park lock mechanism selectively is coupled to the second torque mechanism, wherein in the drive operation state, the park lock mechanism is open, and in the stand-still state the park lock mechanism is closed, and in the recuperation state, the park lock mechanism is open.

In one aspect, the compressor is coupled to an accumulator, wherein the drive operation state, the accumulator drives an AC system when the compressor is not driven by the motor.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is a schematic view on an electric vehicle air conditioning system selectively driven by an electric motor during recuperation and stand-still and disconnected from the motor during normal drive operation.

DESCRIPTION OF THE ENABLING EMBODIMENT

Referring to FIG. 1, a system 10 for managing the power consumption related to an air conditioning system in an electric vehicle is provided. The system 10 includes an electric motor 12 that is selectively coupled and decoupled from a vehicle AC system 14. When coupled, the motor 12 drives an AC compressor 16 of the AC system 14. The AC system 14 is ultimately coupled to the motor 12 via a clutch 18. With the clutch 18 engaged, the motor 12 will drive the compressor 16. With the clutch 18 open, the AC system 14 is not driven by the motor 12. The system 10 can be effectively be divided between motor system components on one side of the clutch 18, and AC system components on the other side of the clutch 18.

With reference to the FIG. 1, and in particular the left side of FIG. 1 and the motor system components, the system 10 includes the motor 12 as previously described. Electric vehicles may include multiple electric motors. Given the interface between the motor components and the AC components at the clutch 18, the motor 12 may preferably be disposed adjacent the AC system 14 in the vehicle, which may be at the front of the vehicle. Accordingly, in this approach, the motor 12 may be used to drive one or both of the front wheels, with the rear wheels driven by a separate motor or not driven at all. For the purposes of discussion, the motor 12 will be described as a single electric motor. However, it will be appreciated that the motor 12 and the AC system 14 may also be disposed at the rear of the vehicle, with the motor driving the rear wheels, or in some cases, the motor 12 may be disposed at the front or rear, with the AC system 14 disposed at the opposite end of the vehicle. For the purposes of discussion, the motor 12 and AC system will be described as being at the front of the vehicle.

The electric motor 12 may include a rotor and stator, as is typical. The rotor is coupled to a main shaft 20, which rotates to ultimately drive the vehicle wheels via a series of connected gears, differentials, or other known mechanisms for transferring rotational energy from an electric motor to vehicle wheels. With reference to FIG. 1, the shaft 20 may be connected to a rotary motion transfer mechanism or torque transfer mechanism 24, which may be in the form of multiple sprockets connected by a chain or a pair/set of gears. FIG. 1 generally illustrates the torque transfer mechanism as a belt-and-sprocket arrangement, but it will be appreciated that such illustration also covers a meshed gear arrangement.

Torque transfer mechanism 24 includes a small diameter element 24a (such as a sprocket or gear) directly connected to the shaft 22, and a large diameter element 24b connected to the small diameter element 24a either directly (such as with gears) or indirectly (such as with sprockets connected by a chain). As shown, the small diameter element 24a is shown spaced away from the large diameter element 24b in FIG. 1, as FIG. 1 illustrates a sprocket-and-gear arrangement. it will be appreciated that a meshed gear arrangement would have these components in contact with each other via their respective meshed teeth.

A second shaft 26 extends from the large diameter element 24b toward a second torque transfer mechanism 28. The second torque transfer mechanism 28 includes a second small diameter element 28a connected to the second shaft 26, and a second large diameter element 28b connected to the second small diameter element 28a. The second torque transfer mechanism 28 is therefore attached to the first torque transfer mechanism 24 via the second shaft 26.

The connection between the first torque transfer mechanism 24 and the second torque transfer mechanism 28 includes a disconnect mechanism 30. The disconnect mechanism 30 operates to selectively connect and disconnect the second torque transfer mechanism 28 from the first torque transfer mechanism 26. it will be appreciated that the disconnect mechanism 30 is illustrated schematically, and that various mechanisms for decoupling a rotating shaft from a rotatable gear or sprocket may be used.

In the illustrated embodiment, the second torque transfer mechanism 28 is connected to the wheels of the vehicle (not shown) via a shaft 31 coupled to the large diameter element 28b. Accordingly, when the disconnect mechanism 30 is open and the first torque transfer mechanism 24 is disconnected from the second torque transfer mechanism 28, the wheels of the vehicle will not be driven by the motor 12, because the motor 12 will cause rotation of the first torque transfer mechanism 24, but this rotation will not be passed on to the second torque transfer mechanism 28.

Optionally, the second torque transfer mechanism 28 may further include a park-lock mechanism 32 that is selectively coupled to the second large diameter element 28b. The park-lock mechanism 32, when engaged with the second large diameter element 28b, locks the vehicle wheels in place to prevent the vehicle from rolling, and may be utilized in a "standstill" mode. This park-lock mechanism 32 may be excluded, however, and the vehicle may be held in place by other mechanisms in the standstill mode.

With reference again to the first torque transfer mechanism 24, in addition to the second shaft 26 that is coupled to the large diameter element 24b, a first clutch shaft 34 may also be connected to the first large diameter element 24b, similar to the second shaft 26. The first clutch shaft 34 may be arranged concentrically and coaxially with the second shaft 26, and extend through and axially beyond the second torque transfer mechanism 28. In one aspect, the second shaft 26 may be a hollow tube structure and the first clutch shaft 34 may extend through the second shaft.

The first clutch shaft 34 is attached to a first side of the clutch 18. The first clutch shaft 34 will rotate along with the first large diameter element 24b of the first torque transfer mechanism 24, which is rotated by the motor 12. When the clutch 18 is engaged, the rotation of the first clutch shaft 34 will transfer its rotation to the compressor 16. Thus, when the motor 12 is activated and the clutch 18 is engaged, the compressor 16 will be activated.

Thus, in view of the above, there are multiple components that may rotate along with the first torque transfer mechanism 24 in response to rotation of the motor 12. The second shaft 26 and the first clutch shaft 34 will always rotate with the first torque transfer mechanism 24 in response to rotation of the motor 12. When the disconnect mechanism 30 is closed, the second torque transfer mechanism 28 will also rotate in response to rotation of the motor 14 and the first torque transfer mechanism 24, thereby powering the wheels. When the clutch 18 is closed/engaged, the compressor 16 will be driven. When the optional park-lock mechanism 32 is included and is engaged on the second torque transfer mechanism 28, the second torque transfer mechanism 28 is locked against rotation, and the disconnect mechanism 30 is therefore controlled to be open when the park-lock mechanism 32 is engaged. The disconnect mechanism 30 may also be controlled to be open when the vehicle wheels are otherwise locked in place through other means when a park-lock mechanism is not included. For example, a signal may be received indicating that the wheels should not be driven, and in response the disconnect mechanism 30 may be actuated to decouple the second torque transfer mechanism and the wheels from the rotation of the first torque transfer mechanism. However, when the disconnect mechanism 30 is open, the torque transfer mechanism 24 may be still rotated by the motor 12 such that compressor 16 may be activated.

With reference to the right side of FIG. 1 and the AC side of the clutch 18, the AC system 14 includes the compressor 16, described above. The compressor 16 can be a typical AC compressor, designed and operated to convert liquid refrigerant into gas, in the process increasing the temperature of the gas that exits the compressor 16 relative to the temperature of the liquid that enters the compressor 16.

A second clutch shaft 36 extends from the clutch 18 opposite the first clutch shaft 34. The second clutch shaft 36 is connected to the compressor 16, and when rotated drives the compressor 16. The compressor 16 may be designed without a traditional belt drive or other connection to a power source, instead receiving the power for driving the compressor 16 from the first torque transfer mechanism 24 when the clutch 18 is closed. Accordingly, when the clutch 18 is open, the compressor 16 is not driven, even if the motor 12 is running and the first torque transfer mechanism 24 is being rotated. The compressor 16 includes an inlet 16a and an outlet 16b. The inlet 16a receives the liquid refrigerant from the AC system 14, and the outlet 16b supplies gas refrigerant to the AC system 14.

The AC system 14 further includes a refrigerant reservoir 38 connected to the inlet side of the compressor 16. The refrigerant reservoir 38 is configured to maintain a supply of refrigerant during the use of the AC system 14, such that a supply of refrigerant is available to the compressor and to account for pulses within the system 14. The system 14 operates as a closed loop, so the average supply of refrigerant in the reservoir 38 over time will generally remain the same. However, over extended periods of time some refrigerant may be lost. The outlet of the reservoir 38 is connected to the inlet 16a of the compressor 16 via a hydraulic line.

The AC system 14 further includes a pressure accumulator 40, which may be in the form of a hydraulic accumulator or high pressure accumulator. The accumulator 40 is designed to maintain a pressure in the hydraulic AC system 14. The refrigerant exiting the AC compressor 16 will flow into the accumulator 40 during operation of the AC system 14, and will likewise flow out of the accumulator 40 during operation.

The system 14 also includes a check valve 42 and a pressure control valve 44 that are associated with the accumulator 40. Thus, check valve 42, the accumulator 40, and the pressure control valve 44 are disposed in series downstream from the AC compressor 16. Thus, the refrigerant flowing out of the compressor 16 will flow through the check valve 42, into and out of the accumulator 40, and then through the pressure control valve 44.

The check valve 42 is in the form of a one-way check valve, allowing refrigerant to flow in the direction of the accumulator 40 from the compressor 16, but blocking flow in the direction of the compressor 16 from the accumulator 40. Accordingly, refrigerant stored in the accumulator 40 will not pass back into the compressor 16 after passing through the check valve 42. The check valve 42 will allow the accumulator 40 to take up additional refrigerant in response to an outflow of refrigerant from the accumulator 40.

The pressure control valve 44 is used to maintain a desired pressure of the refrigerant in the system, and may be adjusted or controlled in response to fluctuations in the pressure of the refrigerant.

The outlet of the pressure control valve 44 connects to the remainder of the AC system 14, where the refrigerant will pass through the system 14 in a manner known in the art, with the refrigerant being cycled through the system 14 and ultimately returning to the refrigerant reservoir 38 described above.

It will be appreciated that the above-described AC system 14 is one aspect of this disclosure, and that alternative arrangements of the AC system, including additional components not shown here, may also be used. Moreover, the components of the AC system 14 connected to both the inlet and outlet of the compressor 16 may be arranged differently while still performing a desirable AC function.

The above described system 10 thus selectively connects the motor side components to the AC system components depending on the operative states of the clutch 18 and the disconnect mechanism 30. The operative states of the clutch 18 and the disconnect mechanism 30 can be controlled by the vehicle electronic control unit (not shown) in response to different driving states, thereby controlling the operation of the AC system 14 based on the driving state.

In a battery powered electric vehicle, there are three vehicle states in which the system 10 can be controlled to provide improved energy usage and the corresponding improved vehicle range and longevity of the vehicle battery. One vehicle state is the "normal" drive operation state, in which the electric motor 12 is used to drive the wheels of the vehicle and propel the vehicle forward. In the drive operation state, the operation of the motor will convert the energy stored in the battery into the power required to drive the vehicle wheels, thereby depleting the battery. This state may also be referred to as the cruising state.

A further vehicle state is the recuperation state. In the recuperation state, the motor 12 will typically act as a generator, such as in instances of regenerative braking, where the kinetic energy of the wheels is used to generate energy, which is used to charge the vehicle battery.

Another vehicle state is the stand-still state. In the stand-still state, the vehicle is not moving, and therefore it is not necessary to drive the wheels by the motor. Because the wheels are not rotating in this state, regenerative braking or recuperation is not occurring, and the motor is not used to hold the wheels in place. To hold the vehicle in place, the park-lock mechanism 32 may hold the wheels in a stationary position, or in the case where the park-lock mechanism is not included, another vehicle holding brake may be used.

The system 10 operates differently depending on which of the above described vehicle states is being used. In the recuperation mode, the disconnect mechanism 30 is closed/engaged, such that the second torque transfer mechanism 28 and the first torque transfer mechanism 26 are connected via the second shaft 26. Accordingly, kinetic energy from the wheels connected to the second torque transfer mechanism 28 will be transferred ultimately to the motor 12, such that the motor 12 may act as a generator and provide power to the connected battery.

Additionally, in this recuperation state, the clutch 18 is closed/engaged, such that rotation of the first torque transfer mechanism 24 will rotate the clutch shafts 34 and 36 together. Similarly, rotation of the clutch shafts 34 and 36 will cause concurrent rotation of the second shaft 26 and the first torque transfer mechanism. Accordingly, the compressor 16 will be driven by the rotation of the second clutch shaft 38, thereby driving the AC system 14. Thus, in the recuperation state, the torque from the motor 12 is controlled to operate the AC compressor 16.

The recuperation energy generated from the wheels is therefore used, at least in part, to drive the AC system 14 rather than to charge the battery, which can be more efficient when the battery is fully charged, where the recuperation energy could otherwise be wasted. The use of this energy to drive the AC system 14 can also reduce instances of overcharging, which can reduce the charging capacity and lifespan of the battery over time.

In the stand-still state, the park-lock mechanism 32 may be closed/engaged as described above, locking the wheels in place, or the wheels may be otherwise locked when the park-lock mechanism 32 is not included. Additionally, the disconnect mechanism 30 is open/disengaged in this state. Accordingly, the second torque transfer mechanism 28 is de-coupled from the first torque transfer mechanism 24 and the motor 12, as well as being de-coupled from the AC system 14. The clutch 18 is closed/engaged in this stand-still state, similar to the recuperation state.

With the clutch 18 closed and the disconnect mechanism 30 open in the stand-still state, the compressor 16 may be driven by the motor 12 via the first torque transfer mechanism 24. The rotation of the first torque transfer mechanism 24 in response to rotation of the motor 12 will rotate the clutch shafts 34, 36 and drive the compressor 16 and the AC system, with the compressor taking in refrigerant from the reservoir 38 and outputting it to the accumulator 40 through the check valve 42. This rotation of the clutch shafts 34, 36 occurs without any torque or rotation being imparted on the second torque transfer mechanism 28 because the disconnect mechanism 30 is open. Therefore, as the motor runs, the wheels are not driven, which is desirable because the wheels are locked by the park-lock mechanism 32 (or other wheel locking mechanism).

In the normal drive operation state, the clutch 18 is opened, such that the AC system 14 is de-coupled from the motor 12. The disconnect mechanism 30 is closed, such that the second torque transfer mechanism 28 is coupled to the first torque transfer mechanism 24 via the shaft 26. During the normal drive operation, the motor 12 drives the wheels via the connection between the torque transfer mechanisms 24, 28, but the compressor 16 is not driven, because the clutch 18 is open. The park-lock mechanism 32 or other wheel-locking mechanism is disengaged during the normal drive operation to allow the wheels to rotate.

With the clutch 18 open during the normal drive operation state and the AC compressor and AC system 14 decoupled from the motor 12, the operation and rotation of the motor will not operate the AC compressor 16. During the normal drive operation state, the AC system is instead driven by the accumulator 40, the pressure in which has been built up during periods when the compressor 16 was being driven by the motor 14 in the other operation states. The accumulator 40 will therefore drive the AC system during this normal drive operation state instead of using the compressor 16.

Thus, the compressor 16, accumulator 40, check valve 42, pressure control valve 44, and refrigerant reservoir 38 work in combination to drive the AC system 14 throughout the use of the vehicle during the various operating states described above. The accumulator 40 can take up additional refrigerant when the compressor 16 is running during the recuperation and stand-still states with refrigerant supplied from the reservoir 38 to the compressor. In the normal drive state, pressure stored in the accumulator will drive the AC system 14, with the reservoir 38 taking up refrigerant when the compressor 16 is not being driven.

During the operation of the vehicle, the vehicle will switch from normal drive operation, to recuperation, and to stand-still frequently, such that the compressor 16 will be driven by the motor 12 at frequent intervals. The accumulator 40 allows the AC system 14 to continue to function, even when the compressor 16 is not actively being driven.

The accumulator 40 may be sized and tailored to meet the particular needs of the AC system 14 in which it is being used. Other aspects of the system may also be tailored to meet the needs of the particular system 10, such as balancing how much energy during recuperation is used for the compressor 16 and the amount of energy is used to recharge the battery.

In an alternative embodiment, the system 10 may be provided without the accumulator 40. In this approach, the compressor 16 will cycle the refrigerant during the standstill and recuperation state when the compressor 16 is driven. But in the normal drive state, when the compressor 16 is not being driven because the clutch 18 is open and the battery is being used to drive the vehicle, the AC system may continue to function via the use of thermal storage, for example using phase change material. A thermal storage device having phase change material storage may be used, such that the phase change material is cooled when the AC system is being driven by the compressor, and when the compressor is not being driven, the cooler state of the phase change material may be transferred via the AC blower to the vehicle cabin in a traditional manner. During the air conditioning process, the phase change material will become warmer as heat is transferred to the vehicle cabin. The material will be re-cooled when the compressor 16 is driven during other vehicle states, and the process can repeat.

Accordingly, the AC system can operate throughout various driving states, including states in which the compressor 16 is not being driven, and the vehicle cabin can continue to be cooled, either by using the above described accumulator 40 or by using a thermal storage device with phase change material storage.

The above described system 10 and the operation thereof therefore provides for increased energy efficiency, utilizing energy from recuperation that might otherwise be wasted or inefficiently used. The above described system 10 provides a reduction in total cost of ownership by increasing the energy efficiency and life of the battery. The system 10 also provides cost reduction by eliminating the use of a traditional high voltage AC compressor, and instead relying on a compressor that is driven by the motor 12 at the above described selected operating periods.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A system for operating an air conditioning system of a pure electric vehicle having wheels that drive the pure electric vehicle, the system comprising:
    an electric motor having regenerative capabilities connected to a battery;
    a disconnect mechanism disposed between the electric motor and at least one of the wheels that drive the pure electric vehicle, the disconnect mechanism having an open state and a closed state;
    an AC compressor connected to the electric motor via a clutch;
    wherein the system includes a recuperation state, in which the disconnect mechanism is closed and the clutch is closed, and recuperation energy from the wheels and energy from the electric motor drive the compressor;
    wherein the system includes a stand-still state, in which the disconnect mechanism is open and the clutch is closed, and the electric motor drives the compressor;
    wherein the system includes a drive operation state, in which the disconnect mechanism is closed and the clutch is open, and the compressor is de-coupled from the electric motor;
    wherein the system provides cooling to a vehicle cabin of the pure electric vehicle during the drive operation state when the compressor is not being driven by the electric motor;
    a first torque transfer mechanism coupled to the electric motor via a first shaft at the output of the electric motor, wherein rotation of the electric motor causes rotation of the first torque transfer mechanism via the first shaft;
    a second torque transfer mechanism coupled to a second shaft for driving the wheels, wherein rotation of the second torque transfer mechanism causes rotation of the second shaft, wherein the second torque transfer mechanism is selectively coupled to the first torque transfer mechanism via the disconnect mechanism;
    wherein the disconnect mechanism is disposed between the first torque transfer mechanism and the second torque transfer mechanism;
    wherein the clutch is disposed between the first torque transfer mechanism and the compressor; and
    wherein the first torque transfer mechanism includes a small diameter element at the first shaft of the electric motor coupled to a large diameter element at an offset axis relative to the first shaft, and the second torque transfer mechanism includes a small diameter element at the offset axis coupled to a large diameter element at the second shaft, wherein the large diameter element of the first torque transfer mechanism is selectively coupled to the small diameter element of the second torque transfer mechanism via the disconnect mechanism;
    wherein the electric motor provides a motor output that drives both the compressor and the wheels that drive the pure electric vehicle, wherein, from the motor output, the compressor receives a lower torque and a higher rotational speed relative to the wheels that drive the pure electric vehicle when the disconnect mechanism is closed and the clutch is closed based on the gear ratios defined by the first torque transfer mechanism and the second torque transfer mechanism;
    wherein, in the standstill state with the electric motor driving the compressor and the disconnect mechanism open, the second torque transfer mechanism is not driven, such that a portion of a torque transmission chain between the wheels and the motor output is not driven by the motor output and the wheels are not driven by the motor output to drive the pure electric vehicle.

2. The system of claim 1, wherein a park lock mechanism is selectively coupled to the second torque transfer mechanism to prevent rotation of the second torque transfer mechanism and prevent driving of the wheels.

3. The system of claim 2, further comprising a first clutch shaft selectively coupled to a second clutch shaft via the clutch, wherein the first clutch shaft is coupled to the first torque transfer mechanism and the second clutch shaft is coupled to the compressor.

4. The system of claim 3, wherein in the drive operation state, the clutch is open and the park lock mechanism is open, such that rotation of the electric motor drives the wheels via the rotation of the first torque transfer mechanism and the second torque transfer mechanism.

5. The system of claim 3, wherein in the stand-still state, the clutch is closed and the park lock mechanism is closed, such that rotation of the electric motor drives the compressor via the first torque transfer mechanism and the first and second clutch shafts, while the second torque transfer mechanism does not rotate.

6. The system of claim 3, wherein in the recuperation state, the park lock mechanism is open and the clutch is closed, wherein recuperation energy from the wheels powers the compressor via rotation of the second torque transfer mechanism, the first torque transfer mechanism, and the first and second clutch shafts.

7. The system of claim 6, wherein the electric motor operates as a generator in the recuperation state.

8. The system of claim 4, wherein the system includes an accumulator coupled to the compressor as part of an AC system, the accumulator for maintaining pressure in the AC system, wherein the accumulator powers the AC system in the drive operation state when the compressor is not driven.

9. The system of claim 1,
wherein the electric motor of the pure electric vehicle is connected to a battery and not connected to an internal combustion engine;
wherein the small diameter element the first torque transfer mechanism is coaxial with the first shaft of the electric motor
wherein the large diameter element of the first torque transfer mechanism is coaxial with the small diameter element of the second torque transfer mechanism and coaxial with the offset axis, wherein the large diameter element of the second torque transfer mechanism is coaxial with the second shaft,
wherein torque transfer flows from the motor output to the small element of the first torque transfer mechanism, from the small diameter element to the large diameter element of the first torque transfer mechanism and the disconnect mechanism; from the disconnect mechanism to the small diameter element of the second torque transfer mechanism, from the small diameter element of the second torque transfer mechanism to the large diameter element of the second torque transfer mechanism and to the second shaft that drives the wheels;
wherein the large diameter element of the first torque transfer element and the small diameter element of the second torque transfer element are aligned with and rotate about the offset axis.

* * * * *